United States Patent
Zimmermann et al.

(10) Patent No.: US 12,338,168 B2
(45) Date of Patent: Jun. 24, 2025

(54) METHOD FOR JOINING AN OPTICAL CRYSTAL TO A SUBSTRATE

(71) Applicant: Q.ANT GMBH, Stuttgart (DE)

(72) Inventors: Felix Zimmermann, Ditzingen (DE); Michael Foertsch, Ansbach (DE); Stefan Hengesbach, Stuttgart (DE); Eugen Ermantraut, Leonberg (DE)

(73) Assignee: Q.ANT GMBH, Stuttgart (DE)

( * ) Notice: Subject to any disclaimer, the term of this patent is extended or adjusted under 35 U.S.C. 154(b) by 137 days.

(21) Appl. No.: 18/177,778

(22) Filed: Mar. 3, 2023

(65) Prior Publication Data

US 2023/0202920 A1 Jun. 29, 2023

Related U.S. Application Data

(63) Continuation of application No. PCT/EP2021/074568, filed on Sep. 7, 2021.

(30) Foreign Application Priority Data

Sep. 9, 2020 (DE) ...................... 10 2020 211 282.7

(51) Int. Cl.
*C03C 27/00* (2006.01)
*B23K 26/0622* (2014.01)
(Continued)

(52) U.S. Cl.
CPC .......... *C03C 27/00* (2013.01); *B23K 26/0624* (2015.10); *B23K 26/211* (2015.10);
(Continued)

(58) Field of Classification Search
None
See application file for complete search history.

(56) References Cited

U.S. PATENT DOCUMENTS

| 2004/0252730 A1 | 12/2004 | McCaughan et al. |
| 2012/0161305 A1 | 6/2012 | Ruben et al. |

(Continued)

FOREIGN PATENT DOCUMENTS

| DE | 102013211977 B3 | 10/2014 |
| DE | 102019214684 A1 | 3/2021 |

(Continued)

OTHER PUBLICATIONS

Machine English translation of JP2013038727, Accessed Nov. 21, 2024 (Year: 2013).*

(Continued)

*Primary Examiner* — Jacob T Minskey
*Assistant Examiner* — Adrianna N Konves
(74) *Attorney, Agent, or Firm* — LEYDIG, VOIT & MAYER, LTD.

(57) ABSTRACT

A method for joining an optical crystal to a substrate includes radiating a pulsed laser beam through the optical crystal or through the substrate onto a surface of an intermediate layer between the optical crystal and the substrate, and forming a fusion zone in the intermediate layer between the optical crystal and the substrate by the radiation of the pulsed laser beam, thereby integrally joining the optical crystal and the substrate.

19 Claims, 1 Drawing Sheet

(51) Int. Cl.
  *B23K 26/211*  (2014.01)
  *B23K 26/324*  (2014.01)
  *G02F 1/355*  (2006.01)
  *G02F 1/365*  (2006.01)
  *B23K 103/00*  (2006.01)

(52) U.S. Cl.
  CPC .......... *B23K 26/324* (2013.01); *G02F 1/3551* (2013.01); *G02F 1/365* (2013.01); *B23K 2103/52* (2018.08); *B23K 2103/54* (2018.08); *B23K 2103/56* (2018.08)

(56) References Cited

U.S. PATENT DOCUMENTS

| | | | |
|---|---|---|---|
| 2013/0344302 | A1 | 12/2013 | Helie et al. |
| 2014/0376581 | A1 | 12/2014 | Stolzenburg et al. |
| 2015/0027168 | A1 | 1/2015 | Dabich, II et al. |
| 2016/0067822 | A1* | 3/2016 | Arai .................. B23K 26/083 65/102 |
| 2017/0047542 | A1 | 2/2017 | Dejneka et al. |
| 2020/0057202 | A1 | 2/2020 | Butler et al. |
| 2022/0004030 | A1* | 1/2022 | Uno .................. G02F 1/03 |
| 2022/0212284 | A1 | 7/2022 | Foertsch et al. |

FOREIGN PATENT DOCUMENTS

| | | | | |
|---|---|---|---|---|
| JP | 2013038727 | A | 2/2013 | |
| WO | WO-2004095149 | A2 * | 11/2004 | .............. G02B 6/13 |
| WO | WO 2017161099 | A1 | 9/2017 | |

OTHER PUBLICATIONS

Machine English translation of WO2004095149, Accessed Nov. 21, 2024 (Year: 2004).*

Hiroki Kawano et al., "Bonding of lithium niobate to silicon in ambient air using laser irradiation," Japanese Journal of Applied Physics, Jul. 2016, pp. 1-5, vol. 55, No. 8S3, The Japan Society of Applied Physics, Tokyo, Japan.

Hui Hu et al., "Lithium niobate-on-insulator (LNOI): status and perspectives," Proceedings of SPIE, May 2012, pp. 1-8, vol. 8431, Society of Photo-Optical Instrumentation Engineers, Bellingham, Washington, USA.

Li Chen et al., "Compact electric field sensors based on indirect bonding of lithium niobate to silicon microrings," Optics Express, Feb. 2012, pp. 4032-4038, vol. 20, Issue 4,Optica Publishing Group. NW Washington, DC, USA.

Ashutosh Rao et al., "Second-harmonic generation in periodically-poled thin film lithium niobate wafer-bonded on silicon," Optics Express, Dec. 2016, pp. 29941-29947, vol. 24, Issue 26, Optica Publishing Group. NW Washington, DC, USA.

Hideki Takagi et al., "Room-temperature bonding of lithium niobate and silicon wafers by argon-beam surface activation," Applied Physics Letters, Apr. 1999, pp. 2387-2389, vol. 74, Issue 16, AIP Publishing, Melville NY,USA.

H. Takagi et al.,"Room-Temperature Wafer Bonding of Silicon and Lithium Niobate by Means of Argon-Beam Surface Activation," Oct. 2002, pp. 53-59, Integrated Ferroelectrics, vol. 50, Issue 1, Taylor & Francis, Oxfordshire United Kingdom.

M. M. R. Howlader et al, "Room temperature bonding of silicon and lithium niobate," Applied Physics Letters, Jul. 2006, pp. 1501-1507, pp. 031914-3, vol. 89, Issue 3, AIP Publishing, Melville NY,USA.

Byoung-Joo Kim et al., "Fabrication of Thick Periodically-poled Lithium Niobate Crystals by Standard Electric Field Poling and Direct Bonding," Journal of the Optical Society of Korea, Dec. 2010, pp. 420-423, vol. 14, No. 4, Optica Publishing Group. NW Washington, DC, USA.

G. Poberaj et al.,"Lithium niobate on insulator (LNOI) for micro-photonic devices," Laser&Photonics Reviews, Feb. 2012, pp. 1-16, Wiley-VCH Verlag GmbH & Co. KGaA, Weinheim, Germany.

Ryo Takigawa et al., "Investigation of the interface between LiNbO3 and Si wafers bonded by laser irradiation," Japanese Journal of Applied Physics, Jul. 2017, pp. 1-3, vol. 56, No. 8, The Japan Society of Applied Physics, Tokyo, Japan.

* cited by examiner

METHOD FOR JOINING AN OPTICAL CRYSTAL TO A SUBSTRATE

CROSS REFERENCE TO RELATED APPLICATIONS

This application is a continuation of International Application No. PCT/EP2021/074568 (WO 2022/053455 A1), filed on Sep. 7, 2021, and claims benefit to German Patent Application No. DE 10 2020 211 282.7, filed on Sep. 9, 2020. The aforementioned applications are hereby incorporated by reference herein.

FIELD

Embodiments of the present invention relate to a method for joining an optical crystal to a substrate.

BACKGROUND

For producing or defining optical waveguides at the chip level, adjacent regions having different refractive indices are required. The variation of the refractive indices for producing these regions is currently predominantly effected by modifying the refractive index of one and the same material or substance in the form of a (nonlinear) optical crystal. However, only small differences in refractive index can be realized in this way. Larger differences in refractive index can be realized by the use of different materials, as a result of which the efficiency of the waveguides subsequently introduced can be significantly increased. For this purpose, it is necessary to bond or join the different materials to one another.

A method for joining or bonding dissimilar materials is described in the article "Bonding of lithium niobate to silicon in ambient air using laser radiation", H. Kawano et al., 2016 Jpn. J. Appl. Phys. 55, No. 8S3, 08RB09. In that case, the laser irradiation is effected using nanosecond laser pulses at room temperature in ambient air. The use of a laser whose light is transparent to one of the two materials enables the interface between the two materials to be heated. Specifically, a method for bonding $LiNbO_3$ to Si is described using a laser having a laser wavelength in the green wavelength range (at 532 nm), at which almost no absorption in $LiNbO_3$ takes place. The pulse duration of the laser pulses is 4 ns, and the pulse repetition frequency is 10 Hz.

The article also describes that the bonding strength of the bonding joint is dependent on the fluence of the laser radiation: in the case of an excessively low fluence, the Si material at the interface does not exceed the melting point and is not melted; in the case of an excessively high fluence, the Si material exceeds the boiling point and ablation occurs. It was ascertained that in the case of a laser fluence of approximately 0.5 $J/cm^2$, it is possible to produce a bonding strength at the interface of more than 2 MPa.

For the production of waveguides, it is advantageous if the optical crystal, which can be formed from lithium niobate, for example, is applied to an insulator or to an insulator layer, which in the case of lithium niobate is referred to as lithium niobate-on-insulator (LNOI).

The article "Lithium Niobate-On-Insulator (LNOI): Status and Perspectives", H. Hu et al., Proc. SPIE, Vol. 8431, 84311D describes a wafer composed of LNOI in which a monocrystalline layer of lithium niobate and an insulator layer of $SiO_2$ formed by implantation of He ions are joined to one another by bonding. The insulator layer of $SiO_2$ is applied on a lithium niobate substrate. For bonding, firstly a layer of lithium niobate is formed on a further substrate. The two substrates are then brought into contact with one another (direct wafer bonding) and subjected to a heat treatment process in which the further substrate detaches from the layer of lithium niobate by way of ion slicing.

The article "Lithium niobate on insulator (LNOI) for micro-photonic devices", G. Poberaj et al., Laser Photonics Rev., 1-16 (2012) proposes a method in which the two substrates are likewise bonded by direct wafer bonding at elevated temperatures or by the use of adhesive polymers (benzocyclobutene).

The article "Compact electric field sensors based on indirect bonding of lithium niobate to silicon microrings", L. Chen et al., Optics Express 20, No. 4, 4032, also discloses the use of a polymer layer of benzocyclobutene for bonding lithium niobate to a silicon substrate.

A further approach consists in the use of a metallic layer, for example a gold layer, for producing a strong joint between the lithium niobate and the substrate during the bonding process; cf. the article "Second harmonic generation in periodically-poled thin film lithium niobate wafer-bonded on silicon", A. Rao et al., Optics Express 24, No. 26, 29941.

The article "Room-temperature bonding of lithium niobate and silicon wafers by argon-beam surface activation", H. Takagi et al., Applied Physics Letters Vol. 74, No. 16, 2387-2389, the article "Room-temperature wafer bonding of silicon and lithium niobate by means of argon-beam surface activation", H. Takagi et al., Integrated Ferroelectrics, 2002, Vol. 50, pp. 53-59, and the article "Room temperature bonding of silicon and lithium niobate", M. M. R. Howlader et al., Applied Physics Letters 89, 031914 (2006) describe the production of lithium niobate/silicon wafers at room temperature with the aid of surface activation, for example by means of an Ar ion beam.

The article "Fabrication of Thick Periodically-poled Lithium Niobate Crystals by Standard Electric Field Poling and Direct Bonding", B. J. Kim et al., Journal of the Optical Society of Korea, Vol. 14, No. 4, December 2010, pp. 420-423 describes that two periodically poled lithium niobate crystals can be joined to one another by direct bonding.

DE 10 2013 211 977 B3 describes a solid-state laser arrangement comprising a laser-active solid and a heat sink thermally coupled to the solid, wherein the laser-active solid and/or the heat sink are/is a component transparent to laser welding radiation. The solid and the heat sink are laser-welded via at least one weld through the transparent component, ultrashort pulse laser radiation being used for the laser welding. The at least one weld is arranged exclusively outside a pump region of the solid that is pumped during laser operation.

US 2015/0027168 A1 describes a method for bonding a workpiece. In the method, an inorganic layer is formed on the surface of a first substrate, the workpiece is arranged between the first substrate and the second substrate, the layer being in contact with the second substrate, and the workpiece is bonded between the first substrate and the second substrate by local heating of the layer by the layer being irradiated with laser radiation having a predefined wavelength. The inorganic layer, the first substrate or the second substrate is transmissive to wavelengths of between approximately 420 nm and approximately 720 nm.

SUMMARY

Embodiments of the present invention provide a method for joining an optical crystal to a substrate. The method includes radiating a pulsed laser beam through the optical crystal or through the substrate onto a surface of an intermediate layer between the optical crystal and the substrate, and forming a fusion zone in the intermediate layer between the optical crystal and the substrate by the radiation of the pulsed laser beam, thereby integrally joining the optical crystal and the substrate.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
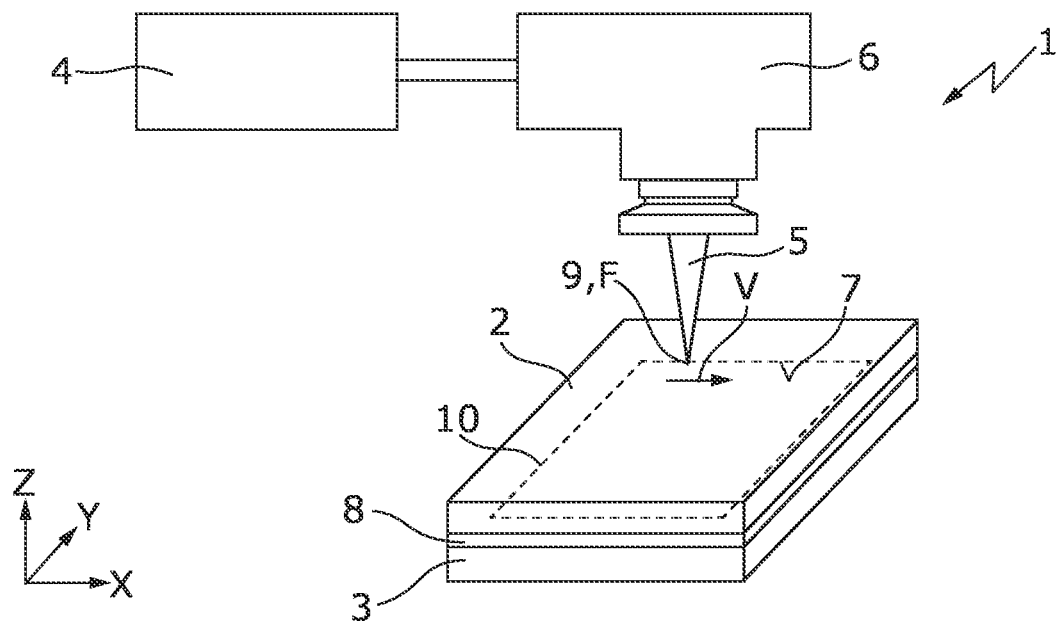
FIG. 1 shows a schematic illustration of a device for joining an optical crystal to a substrate by radiating a pulsed laser beam onto a surface of an intermediate layer formed between the optical crystal and the substrate, according to some embodiments.

Embodiments of the present invention provide a method in which an intermediate layer is formed between the optical crystal and the substrate, and in which the pulsed laser beam is radiated onto a surface of the intermediate layer in order to form the fusion zone.

Within the meaning of this application, an "optical crystal" is understood to be a crystal whose material properties enable use for optical applications, for example for guiding radiation in an optical waveguide. In particular, the optical crystal can be a nonlinear optical crystal. Some (nonlinear) optical crystals, for example lithium niobate, have piezoelectric properties and, owing to these properties, can also be used for radiofrequency applications in the kHz, MHz or GHz range.

The surface of the intermediate layer onto which the laser beam is radiated is typically the surface facing the optical crystal if the laser beam is radiated through the optical crystal. For the case where the laser beam is radiated onto the intermediate layer through the substrate, the irradiated surface is typically the surface of the intermediate layer facing the substrate. Radiating the pulsed laser beam onto the intermediate layer or onto the surface of the intermediate layer typically requires the material of the optical crystal or of the substrate through which the radiating takes place to be transparent to the wavelength of the radiated laser beam.

The laser beam radiated onto the surface of the intermediate layer need not necessarily be focused onto the surface of the intermediate layer. In general, however, the laser beam is focused in the vicinity of the surface of the intermediate layer. The focus position may deviate from the irradiated surface of the intermediate layer typically by a distance which is up to approximately 10 times the Rayleigh length of a Gaussian beam, in the thickness direction of the substrate or of the optical crystal. For the case where the laser beam has a quasi-nondiffractive beam profile, an elongated focus zone is formed in the thickness direction, which may possibly extend over the entire thickness of the intermediate layer.

Most of the bonding methods described further above exhibit the problem that they have to be carried out at elevated temperatures. The generally large differences in the coefficients of thermal expansion of the materials serving as bonding partners often lead to delamination through to complete destruction of one of the materials. This problem can be avoided by means of a laser welding process because the material processing takes place locally and elevated temperatures therefore occur only locally.

It has been found that, in the case of such a laser welding process, the fracture toughness of the joint between the optical crystal and the substrate can be improved by means of the intermediate layer: In this case, the fusion zone is formed not only at the surface of the substrate or of the optical crystal, but also in the intermediate layer. The material of the intermediate layer is generally melted in the process. The fracture toughness of the joint can therefore be improved given a suitable choice of the material of the intermediate layer. In addition, the material properties of the intermediate layer during the production thereof can usually be influenced more easily than is the case during the production of the substrate itself, and so the fracture toughness and also other properties of the joint can be influenced more easily.

In one variant of the method, the intermediate layer is formed from a dielectric material. The use of an intermediate layer composed of a dielectric, electrically nonconductive or only weakly electrically conductive material is advantageous since such a material forms an insulator layer during the production of waveguides or the like in the optical crystal. Such an insulator layer makes it possible to form a refractive index structure for planar waveguiding which produces vertical confinement of the light guided in the waveguide.

The intermediate layer can therefore both improve the fracture toughness of the joint and produce the refractive index variation which is advantageous or required for the waveguide structure. The production of waveguide structures in an optical crystal can be effected by laser ablation, for example, in particular using ultrashort pulse laser radiation, as is described in DE 10 2019 214 684.8.

In a further variant, the material of the intermediate layer is selected from the group comprising: $SiO_2$, $Si_3N_4$, TiN, SiC, III-V compound semiconductors and alloys thereof. These materials are dielectrics or semiconductors which can be used as an insulator layer or for producing a refractive index variation for the production of waveguide structures or other microstructures in the optical crystal. The III-V compound semiconductors can be nitrides, phosphides, arsenides or antimonides.

In a further variant, the intermediate layer is deposited on the substrate and/or on the optical crystal prior to joining. The intermediate layer can be deposited on the substrate by a conventional coating process, i.e. usually by vapor deposition (PVD, CVD, etc.). Deposition of the intermediate layer by epitaxial growth is also possible. By way of example, an intermediate layer composed of a III-V compound semiconductor is typically deposited by epitaxial growth. The deposition of the intermediate layer on the substrate means that it is not necessary to produce an additional bonding joint between the substrate and the intermediate layer.

In a further variant, the intermediate layer has a thickness of between 1 nm and 50 μm, preferably between 400 nm and 5 µm. An intermediate layer having such a thickness can be applied with the aid of the coating methods described further above, with comparatively little outlay. For optical applications, the layer thickness of the intermediate layer is typically in the range of between 400 nm and 5 µm.

In principle, it is alternatively also possible to produce the intermediate layer by converting the material of the substrate, for example by ions being implanted into the material of the substrate in a volume region near the surface or by the material conversion being carried out by means of thermal oxidation, for example. The intermediate layer may, if appropriate, also form a native oxide layer which forms at the surface of the substrate upon contact with the ambient air, provided that measures for preventing oxidation have not been taken.

The material of the substrate can be silicon, for example, but also some other material which is suitable for applying the intermediate layer, e.g. an optical crystal or a glass material, e.g. borosilicate glass. It goes without saying that the intermediate layer need not necessarily be applied directly to the substrate, rather other layers may, if appropriate, be arranged between the intermediate layer and the substrate, said other layers serving for example as an adhesion promoter layer or the like.

In a further variant, the optical crystal is selected from the group comprising: lithium niobate ($LiNbO_3$), lithium tantalate ($LiTaO_3$), potassium titanyl phosphate (KTP) and diamond. The nonlinear crystals $LiNbO_3$, $LiTaO_3$ and KTP and diamond can serve for producing waveguide structures or other microstructures after bonding. It goes without saying that the method can also be carried out with materials other than those mentioned.

When irradiating the surface, the pulsed laser beam is focused onto or into the vicinity of the surface of the intermediate layer and forms an influence region or a focus zone corresponding to the fusion zone, at which a local, integral joint is formed between the optical crystal and the intermediate layer and thus the substrate. The vertical extent of the focus zone or of the fusion zone (in the thickness direction of the substrate) and also the lateral extent of the focus or fusion zone (perpendicular to the thickness direction of the substrate) can be set in a targeted manner by way of various laser parameters such as laser wavelength, pulse duration, pulse repetition rate, average laser power, and/or beam shaping, in order to influence or optimize the properties of the integral joint, in particular the fracture toughness thereof. Suitable ranges in which the laser parameters can be varied in order to set the properties of the integral joint are specified below.

In a further variant, the irradiating is effected with a laser beam with a wavelength of more than 800 nm, preferably of more than 1000 nm. It has been found that the use of laser radiation at wavelengths in the IR wavelength range is well suited to the present application. The laser beam or the laser radiation can be generated for example by means of a solid-state laser, e.g. with a wavelength of 1030 nm. The laser radiation generated by the laser is shaped to form a processing laser beam with the aid of a suitable beam shaping optical unit configured for setting the focus position and, if appropriate, the shape of the focus zone. In principle, laser radiation at other wavelengths, for example in the visible wavelength range, can also be used for carrying out the method. It is essential for the material either of the optical crystal and/or of the substrate to be transparent at the laser wavelength. The respective other material typically absorbs the laser radiation at the laser wavelength.

In a further variant, the pulsed laser beam is radiated onto the surface with a pulse duration of between 0.1 ps and 20 ps, preferably of between 0.1 ps and 2 ps. It has been found that the pulse duration, in particular, has a considerable influence on the fracture toughness of the joint. A pulse duration of the laser pulses of the order of magnitude of picoseconds has proved to be particularly advantageous for the fracture toughness of the integral joint. The pulse duration of the laser pulses is understood to mean the temporal width at half the maximum light power in an individual laser pulse.

In a further variant, the irradiating is effected with a laser beam with an average laser power of between 0.1 W and 20 W, preferably of between 1 W and 15 W. The average laser power is understood to mean the product of the pulse energy (of the peak power of an individual laser pulse integrated over time) and the repetition rate of the laser pulses during continuous operation, e.g. of the order of magnitude of more than 1 MHz, or the repetition rate of the bursts during burst operation, e.g. of the order of magnitude of 10 kHz, multiplied by the number of pulses within a burst.

The pulsed laser beam can have a Gaussian beam profile, but it is also possible for the laser beam to have a different type of beam profile. Preferably, the laser beam is radiated onto the intermediate layer with a quasi-nondiffractive beam profile, in particular with a Bessel-like beam profile.

A nondiffractive beam constitutes a solution to the Helmholtz equation which can be separated into a longitudinal portion and into a transverse portion. Such a nondiffractive beam has a transverse beam profile which is propagation-invariant, i.e. which does not change during the propagation of the nondiffractive beam. Depending on the coordinate system used, different solution classes of nondiffractive beams arise, for example Mathieu beams in elliptical-cylindrical coordinates or Bessel beams in circular-cylindrical coordinates.

A nondiffractive beam constitutes a theoretical construct which can be realized to a good approximation in the form of so-called quasi-nondiffractive beams. A quasi-nondiffractive beam has the propagation invariance only over a finite length (characteristic length) L. A quasi-nondiffractive beam is present precisely when, given a similar or identical focus diameter, the characteristic length L significantly surpasses the Rayleigh length of the associated Gaussian focus, in particular if it holds true that: $L > z_R$, where $z_R$ denotes the Rayleigh length of the Gaussian beam. The characteristic length L can be e.g. of the order of magnitude of 1 mm or more.

One subset of the quasi-nondiffractive beams is constituted by the Bessel-like beams, in which the transverse beam profile in proximity to the optical axis corresponds to a good approximation to a Bessel function of the first kind of order n. One subset of the Bessel-like beams is constituted by the Bessel-Gaussian beams, in which the transverse beam profile in proximity to the optical axis corresponds to a good approximation to a Bessel function of the first kind of order 0 which is enveloped by a Gaussian distribution.

The use of a quasi-nondiffractive beam profile has proved to be advantageous for the present application since, in the case of such a beam profile, a substantially homogeneous beam profile can be maintained over a comparatively long distance in a longitudinal direction, whereby the material in the region of the intermediate layer can be melted homogeneously.

A suitable beam shaping optical unit is used for producing the quasi-nondiffractive beam profile. A Bessel-like beam has proved to be particularly advantageous for the present application, but optionally other quasi-nondiffractive beam profiles, e.g. an Airy beam profile, a Weber beam profile or a Mathieu beam profile, can also be produced by means of the beam shaping optical unit. The beam shaping optical unit can be configured in particular to produce a quasi-nondiffractive beam profile with a beam cross section that is rotationally symmetrical with respect to the propagation direction, as is the case for a Bessel-Gaussian beam, for example.

In a further variant the method comprises: forming a continuous or interrupted weld seam along the intermediate layer by moving the pulsed laser beam and the optical crystal relative to one another along an advancing direction. By means of the relative movement of the pulsed laser beam and the substrate, the focus zone (spot) or the fusion zone is moved laterally along the surface or along the intermediate layer at a defined advancing rate. Weld seams can be produced in this way, whereby large-area workpieces can be bonded (at the wafer level). The weld seam can be formed in continuous or interrupted fashion. The use of a continuous weld seam is advantageous for example if hermetic sealing of cavities is intended to be produced by means of the method. If hermetic sealing is not required, the weld seam can be formed in interrupted fashion in order to reduce the process time for the bonding process.

The advancing direction and thus the direction of the weld seam can be constant in sections, such that rectilinear sections are formed, but it is also possible for the advancing direction to vary in a location-dependent manner and for a curvilinear weld seam to be formed. The laser beam can be moved with the aid of a suitable optical unit, for example with the aid of a scanner optical unit. In general, it is advantageous if the substrate and the optical crystal which are intended to be joined to one another along the surface remain stationary during joining. In principle, however, it is also possible for the substrate and the optical crystal to be displaced jointly during joining. In order to avoid a relative movement in a lateral direction between the substrate and the optical crystal, it is necessary in this case to accommodate them in a suitable mount.

The method described above makes it possible to produce a selective bonding joint between the optical crystal and the substrate at the chip level, in which case even materials having greatly different coefficients of thermal expansion can be joined to one another. As a result, it is possible to bond optical crystals on materials with a greatly different refractive index and to prepare chips for the production of waveguides with large differences in refractive index between core and cladding at the chip level. In addition, there is the possibility of combining electrical and optical circuits on two substrates and producing hybrid microsystems such as magnetometers, interferometers, random number generators or optical quantum computers. The bonding method described here can serve as a preparatory method for subsequent processes, for example for producing waveguides or hermetically sealing cavities.

In a further variant, the method comprises: ablating material from the optical crystal after joining in order to form at least one waveguide on the optical crystal, which is preferably arranged outside the at least one weld seam, i.e. does not overlap the weld seam.

Forming the waveguide by material ablation can be effected for example by laser ablation, in particular using ultrashort pulse laser radiation, as is described in DE 10 2019 214 684.8, the entirety of which is incorporated by reference in the content of this application. In the case of such a waveguide structure, an intermediate layer in the form of a dielectric layer is generally mandatory in order that the light is guided exclusively in the waveguide itself. The at least one weld seam used for joining the optical crystal to the substrate is preferably arranged outside the waveguide structure or outside the waveguide in order to avoid generally disadvantageous influencing of the waveguide, more precisely of the guiding of light by the waveguide.

In a further variant, the method comprises: structuring a surface of the optical crystal, preferably after joining, in order to form electrical, acoustic and/or optical microcomponents, preferably filters or antennas, in particular for radiofrequency technology. Structuring the surface can be effected with the aid of a photolithographic method, for example, in which a structured metal layer is applied to the surface of the optical crystal, which forms the microcomponents or a portion of the microcomponents. In general, structuring the surface of the optical crystal is effected only after joining to the substrate; optionally, however, this is already possible even prior to joining.

The acoustic components can be for example surface acoustic wave components for radiofrequency technology (in the microwave or GHz range), e.g. for mobile radio, for example surface acoustic wave filters, antennas, interdigital transducers, impedance converters, reflectors, etc. Such surface acoustic wave components e.g. in the form of surface acoustic wave filters can have microcomponents e.g. in the form of comblike-intermeshing electrodes ("fingers") which are applied to the surface of the crystal. The surface acoustic waves are generated using the piezoelectric effect in the optical crystal, which can be e.g. lithium niobate in this case. When structuring the surface, in this case, generally (metallic) material is deposited on the otherwise planar surface of the crystal and is suitably structured, but no material is ablated from the surface.

In a further variant, the method comprises: selectively removing the intermediate layer, in particular by etching before or after forming the at least one weld seam, in order to form freestanding microstructures, in particular microelectromechanical (MEMS) systems or optical resonators, e.g. whispering gallery resonators, on the optical crystal. Freestanding microstructures are understood to mean microstructures on the crystal which have at least one region which is not directly joined to the substrate in the thickness direction, because the intermediate layer is absent, or which are spaced apart from the rest of the crystal in a lateral direction.

In order to produce laterally freestanding microstructures, it is possible to carry out a selective welding process between the crystal and the substrate such as has been described further above. What can be achieved in this way is that it is not necessary for the entire material that is to be removed around a freestanding microstructure to be removed again by selective etching or laser ablation, since non-welded regions can be removed from the crystal if the selective ablation is effected along a suitable ablation contour. This is advantageous for example in order to produce phase shifters or beam splitters which, in the optically sensitive region, do not have stresses as a result of the bonding process between substrate and crystal.

In order to produce freestanding microstructures which are spaced apart from the substrate in the thickness direction, the intermediate layer is typically removed selectively. In this way, micromechanical microstructures can be formed which, in the case of lithium niobate as crystal material, can be moved, if appropriate, on account of the piezoelectric effect and form MEMS systems in this case. In addition, for example, optical whispering gallery resonators can be separated from the substrate in the thickness direction in order thus to reduce the circulation losses of the guided modes. The intermediate layer can be removed e.g. by etching or by laser ablation prior to forming the at least one weld seam. The structuring of the intermediate layer can be produced during the production thereof or during the deposition thereof on the crystal, can be introduced by means of an etching process, or can be produced by means of laser ablation. The later welding of the crystal to the substrate is effected by the production of selective weld seams in a region in which the intermediate layer is applied. Undercutting of the laterally freestanding structures is possible after bonding, such that said structures become freestanding in the thickness direction as well. The intermediate layer is removed during the etching process.

A further aspect of the invention relates to a component, in particular a waveguide, which is produced by means of the bonding method described further above (optionally in combination with a structuring of the surface or selective, partial ablation of the crystal and/or of the intermediate layer). In the simplest case, the component is a wafer in which the optical crystal is joined to the substrate along the intermediate layer. However, the component can also be a structured component in which a microstructure, e.g. in the form of a waveguide structure, is formed in the optical crystal by material ablation after joining. Even more complex components in the form of electrical and optical circuits or quantum computers are possible.

Further advantages of the invention are evident from the description and the drawing. Likewise, the features mentioned above and those that are yet to be presented can be used in each case by themselves or as a plurality in any desired combinations. The embodiments shown and described should not be understood as an exhaustive enumeration, but rather are of exemplary character for outlining the invention.

In the following description of the drawings, identical reference signs are used for identical or functionally identical components.

FIG. 1 shows an exemplary setup of a device 1 for carrying out a method for joining an optical crystal 2, e.g. in the form of a wafer, to a (carrier) substrate 3, which is likewise present in the form of a wafer. The optical crystal 2 was positioned on the substrate 3 prior to carrying out the method.

The device 1 comprises a laser source 4 for generating a laser beam 5, which is fed to an optical unit integrated in a laser processing head 6. In the example shown in FIG. 1, the laser source 4 is a solid-state laser configured for generating the laser beam 5 at a wavelength $\lambda_L$ in the IR wavelength range, more precisely at 1030 nm. The use of a laser source 4 configured for generating a laser beam 5 at a different wavelength $\lambda_L$, e.g. at more than 800 nm, more than 1000 nm, or in the visible wavelength range, is likewise possible.

The laser processing head 6 serves for deflecting and aligning the laser beam 5 with the optical crystal 2. The laser processing head 6 also has a focusing optical unit in order to radiate or focus the laser beam 5 onto the optical crystal 2, more precisely onto a surface 7 of a (functional) intermediate layer 8 facing the optical crystal 2, said intermediate layer being formed between the optical crystal 2 and the substrate 3. The intermediate layer 8 makes it possible to set the optical and/or mechanical properties of the stack which arises during the joining of the optical crystal 2 to the substrate 3. In particular, the intermediate layer 8, more precisely its physical properties (material, thickness, etc.), makes it possible to improve the fracture toughness of the optical crystal 2 on the substrate 3, as will be described in greater detail further below.

In FIG. 1, the laser beam 5 is radiated through the optical crystal 2, i.e. the optical crystal 2 is transparent to the wavelength $\lambda_L$ of the laser beam 5. However, this does not apply to the material of the intermediate layer 8 nor to the material of the substrate 3, each of which absorbs the laser beam 5. The absorption of the laser beam 5 has the effect that the material of the intermediate layer 8 and of the optical crystal 2 and possibly of the substrate 3 heats up. At a focus position F of the laser beam 5 at or in the vicinity of the surface 7, a fusion zone 9 forms as a result of the heating. After cooling, the fusion zone 9 has the effect that the optical crystal 2 is integrally joined (locally) to the intermediate layer 8 and thus to the substrate 3.

In the example shown in FIG. 1, the optical crystal 2 is lithium niobate ($LiNbO_3$), the material of the substrate 3 is silicon (Si) and the material of the intermediate layer 8 is silicon oxide ($SiO_2$). The crystal orientation of the lithium niobate was present as a so-called z-cut, but the use of other crystal orientations (e.g. x-cut or y-cut) is likewise possible.

As an alternative to focusing or radiating the laser beam 5 through the optical crystal 2 onto the intermediate layer 8, it is possible to radiate the laser beam 5 through the substrate 3 onto a surface of the intermediate layer 8 facing the substrate 3. In this case, it is necessary for the substrate 3 to be transparent to the wavelength $\lambda_L$ of the laser beam 5. By way of example, a glass material can be used as substrate 3 in this case.

It goes without saying that optical crystals 2 composed of other materials, e.g. lithium tantalate ($LiTaO_3$), potassium titanyl phosphate (KTP) or diamond, can also be bonded or joined to a substrate 3 in the manner described here, which substrate can comprise for example silicon, a glass material or likewise an optical crystal.

As has been described further above, the properties of the intermediate layer 8 can be chosen such that, inter alia, the fracture toughness of the optical crystal 2 on the substrate 3 is improved. This is the case for example for the intermediate layer composed of $SiO_2$ described further above, which, for the optical crystal 2 composed of lithium niobate, increases the fracture toughness on the substrate 3 composed of silicon.

Depending on the materials of the optical crystal 2 and the substrate 3, it is possible to select a suitable material for the intermediate layer 8 which increases the fracture toughness of the joint compared with directly joining the optical crystal 2 to the substrate 3. The materials from which the intermediate layer 8 is formed can be dielectric materials, in particular. Besides the $SiO_2$ used in the example described here, e.g. $Si_3N_4$, TiN, SiC, III-V compound semiconductors and alloys thereof can be involved.

The intermediate layer 8 is deposited onto the substrate 3 and/or on the optical crystal 2 prior to joining to the optical crystal 2. Conventional coating methods for vapor deposition (PVD, CVD, etc.) can be used for the deposition. Deposition of the intermediate layer 8 by epitaxial growth is also possible. A thickness d of the intermediate layer 8 which is between 1 nm and 50 μm has proved to be advantageous both for joining the optical crystal 2 to the substrate 3 and for the subsequent use of the composite comprising optical crystal 2 and substrate 3. For optical applications, the thickness d of the intermediate layer 8 is generally in the range of between 400 nm and 5 μm.

As an alternative to deposition, the intermediate layer 8 can also be formed by altering the material of the substrate 3 and/or of the optical crystal 2, for example by ions being implanted into a volume region near the surface. Moreover, a native oxide layer that forms when the material of the substrate 3 and/or of the optical crystal 2 comes into contact with the ambient air can optionally serve as intermediate layer 8.

Besides the intermediate layer 8, in particular the material of the intermediate layer 8, the parameters of the laser beam 5 (laser parameters) can also influence or improve the properties, in particular the fracture toughness, of the joint between the optical crystal 2 and the substrate 3. The laser parameters influence, inter alia, the dimensions of the fusion zone 9 between the optical crystal 2 and the substrate 3, specifically both in a horizontal direction, i.e. parallel to an XY-plane of an XYZ-coordinate system, in which the surface 7 of the intermediate layer 8 extends, and in a vertical direction (Z-direction) corresponding to the thickness direction of the optical crystal 2 and of the substrate 3.

The laser parameters which influence the properties of the joint are, inter alia, the laser wavelength $\lambda_L$, the pulse duration $\tau$, the pulse repetition rate during continuous operation or the burst repetition rate and the number of pulses in the burst during burst operation, the average laser power p and the beam shaping, in particular the beam or focus profile of the laser beam 5. Suitable value ranges for the laser parameters mentioned above are specified below.

In the example shown, the laser source 4 is configured to generate a pulsed laser beam 5 having pulse durations $\tau$ in the ps range. For the method described here, pulse durations $\tau$ of between 0.1 ps and 20 ps, in particular between 0.1 ps and 2 ps, e.g. of less than 1 ps, have proved to be advantageous.

Radiating the pulsed laser beam 5 with an average power p of between 0.1 W and 20 W, in particular of between 1 W and 15 W, e.g. at approximately 1.5 W, onto the surface 7 has proved to be advantageous for the fracture toughness of the joint. The same applies to the pulse repetition rate of the pulsed laser beam 5, which should be between 200 kHz and 2 MHz, e.g. at approximately 400 kHz, for a good fracture toughness of the joint.

In the example shown in FIG. 1, the laser beam 5 has a Gaussian beam profile having a raw beam diameter of approximately 3.6 mm. However, it is also possible for the laser beam 5 to have a different type of beam profile, for example a quasi-nondiffractive beam profile, in particular a Bessel-like beam profile. In the case of such a beam profile, a substantially homogeneous beam profile is maintained over a comparatively long distance in a longitudinal direction, i.e. in the thickness direction of the optical crystal 2 or of the substrate 3 (Z-direction), as a result of which a fusion zone 9 extended in the thickness direction can be produced. A laser beam 5 having a quasi-nondiffractive beam profile can be generated by a suitable beam shaping optical unit (e.g. an axicon or a diffractive optical element), which can be integrated e.g. in the laser processing head 6.

By varying the focus position F and thus the fusion zone 9 along the surface 7, it is possible to produce a continuous or—as illustrated in FIG. 1—an interrupted weld seam 10 in order to join larger areas, e.g. of the order of magnitude of the area of wafers. For varying the focus position F, in the case of the example shown in FIG. 1, a relative movement between the laser beam 5 and the optical crystal 2 (or the surface 7 of the intermediate layer 8) is achieved by the laser beam 5 being deflected and moved over the surface 7 with the aid of a scanner optical unit integrated in the laser processing head 6. In the example shown, the advancing rate v during the movement of the laser beam 5 over the surface 7 was approximately 5 mm/s, but it can also be chosen to be larger or smaller.

Forming an interrupted weld seam 10 such as is illustrated in FIG. 1 makes it possible to shorten the process time of the bonding or joining process. For the case where a closed cavity is intended to be formed and hermetically sealed in the optical crystal 2, the weld seam 10 shown in FIG. 1 can be formed in continuous fashion.

Figure 2:
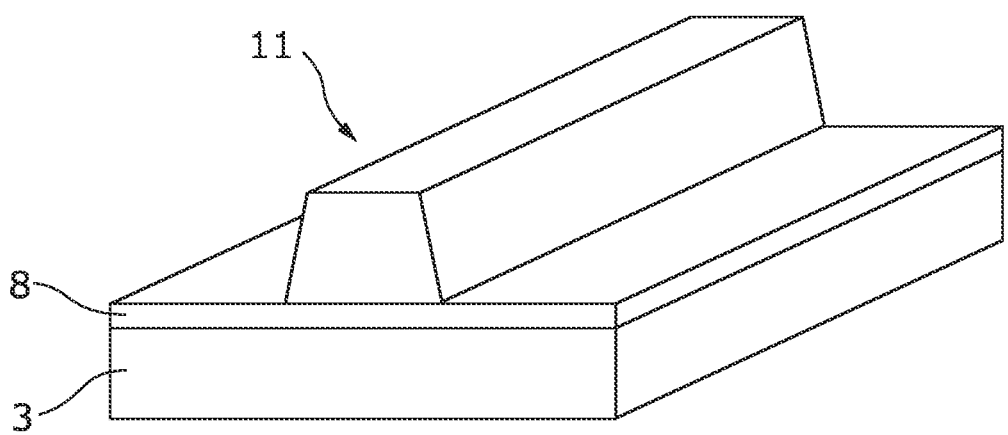
FIG. 2 shows an optical component in the form of an optical waveguide which was formed by subsequent material ablation on the optical crystal, according to some embodiments.

The bonding or joining method described here can serve as a preparatory method for subsequent processes, for example for the production of closed cavities described further above or for the production of an optical waveguide 11 e.g. in the form of a ridge waveguide, as is illustrated by way of example in FIG. 2. The waveguide 11 is produced by selectively ablating the material of the optical crystal 2 after the latter has been joined to the substrate 3 or to the intermediate layer 8. The material ablation can be effected for example using ultrashort pulse laser radiation, as is described in DE 10 2019 214 684.8.

If the weld seam 10 is situated at the underside of the waveguide 11 or overlaps the latter, this can result in undesired inhomogeneities which disadvantageously influence the guiding of light in the waveguide 11. It is therefore advantageous if the waveguide 11 does not overlap the weld seam 10 shown in FIG. 1, i.e. if the waveguide is arranged outside the weld seam 10.

As has been described further above, the intermediate layer 8 makes it possible to influence the optical and mechanical properties of the composite comprising the optical crystal 2 and the substrate 3 in a targeted manner.

For the case where a waveguide 11 is intended to be produced in the optical crystal 2, as is illustrated in FIG. 2, it has proved to be advantageous if the intermediate layer 8 is formed from a dielectric (insulator) material. Such a material typically has a considerable difference in refractive index by comparison with the optical crystal 2 and in this way makes it possible to form a refractive index structure for planar waveguiding which produces vertical confinement of the light guided in the waveguide 11. Besides joining materials having greatly different refractive indices, it is also possible for materials having distinctly different coefficients of thermal expansion to be joined to one another in the manner described further above, without problems occurring during joining e.g. as a result of delamination of the materials in the course of a heat treatment.

Microstructures other than waveguides 11 can also be produced in the optical crystal 2 with the aid of the method described further above. These microstructures can be freestanding microstructures, for example, which are produced by selective removal of the intermediate layer 8. The selective removal can be effected e.g. by etching or by laser ablation prior to or after forming the at least one weld seam 10 described further above. By way of example, in this case, the intermediate layer 8 can be deposited on the rear side of the optical crystal 2 and be removed again selectively in partial regions by means of a photolithographic etching method. In this case, the optical crystal 2 is welded to the substrate 3 selectively only in partial regions in which the intermediate layer 8 was not ablated. The partial region(s) in which the intermediate layer 8 was removed form(s) the freestanding region of the respective microstructure.

In the case of lithium niobate as material of the crystal 2, the respective freestanding microstructure can be a MEMS component, for example, which can be moved by the use of the piezoelectric effect. A freestanding microstructure in the form of an optical resonator, for example a whispering gallery resonator, can also be produced in the manner described further above.

Besides the production of optical microstructures, e.g. in the form of waveguides 11 or other optical components, which generally requires material ablation, it is also possible to structure the surface of the optical crystal 2, for example by a structured metallic layer being applied to said surface, in order to form electrical, acoustic and/or optical microcomponents or microstructures.

Particularly for the case where the optical crystal 2 is formed from a piezoelectric material such as lithium niobate, for example, such microcomponents can be used for producing microcomponents for radiofrequency technology, e.g. for mobile radio. The piezoelectric properties of the optical crystal 2 can be used in this case to produce surface acoustic waves at the surface of the optical crystal 2. Surface acoustic wave components for radiofrequency technology can be realized in this way. The surface acoustic wave components can be surface acoustic wave filters, antennas, interdigital transducers, impedance converters, reflectors, etc.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for joining an optical crystal to a substrate, the method comprising:
   radiating a pulsed laser beam through the optical crystal or through the substrate onto a surface of an intermediate layer between the optical crystal and the substrate, wherein the optical crystal and the substrate are made of different materials, and
   forming a fusion zone in the intermediate layer between the optical crystal and the substrate by the radiation of the pulsed laser beam, thereby integrally joining the optical crystal and the substrate.

2. The method as claimed in claim 1, wherein the intermediate layer comprises a dielectric material.

3. The method as claimed in claim 1, wherein a material of the intermediate layer is selected from the group consisting of: $SiO_2$, $Si_3N_4$, TiN, SiC, III-V compound semiconductors and alloys thereof.

4. The method as claimed in claim 1, wherein the intermediate layer is deposited on the substrate and/or on the optical crystal prior to joining.

5. The method as claimed in claim 1, wherein the intermediate layer has a thickness of between 1 nm and 50 μm.

6. The method as claimed in claim 5, wherein the intermediate layer has a thickness of between 400 nm and 5 μm.

7. The method as claimed in claim 1, wherein the optical crystal is selected from the group consisting of: $LiNbO_3$, $LiTaO_3$, KTP and diamond.

8. The method as claimed in claim 1, wherein the pulsed laser beam is radiated onto the surface with a wavelength of more than 800 nm.

9. The method as claimed in claim 8, wherein the pulsed laser beam is radiated onto the surface with a wavelength of more than 1000 nm.

10. The method as claimed in claim 1, wherein the pulsed laser beam is radiated onto the surface with a pulse duration of between 0.1 ps and 20 ps.

11. The method as claimed in claim 10, wherein the pulsed laser beam is radiated onto the surface with a pulse duration of between 0.1 ps and 2 ps.

12. The method as claimed in claim 1, wherein the pulsed laser beam is radiated onto the surface with an average laser power of between 0.1 W and 20 W.

13. The method as claimed in claim 12, wherein the pulsed laser beam is radiated onto the surface with an average laser power of between 1 W and 15 W.

14. The method as claimed in claim 1, wherein the pulsed laser beam is radiated onto the surface with a pulse repetition rate of between 200 kHz and 2 MHz.

15. The method as claimed in claim 1, wherein the pulsed laser beam is radiated onto the surface of the intermediate layer with a Bessel-like beam profile.

16. The method as claimed in claim 1, further comprising:
   forming at least one continuous or interrupted weld seam along the intermediate layer by moving the pulsed laser beam and the optical crystal relative to one another along an advancing direction.

17. The method as claimed in claim 1, further comprising: after joining the optical crystal and the substrate, ablating material from the optical crystal in order to form at least one waveguide on the optical crystal.

18. The method as claimed in claim 1, further comprising: after joining the optical crystal and the substrate, structuring a surface of the optical crystal in order to form electrical, acoustic, and/or optical microcomponents.

19. The method as claimed in claim 1, further comprising: selectively removing the intermediate layer in order to form freestanding microelectromechanical systems or optical resonators.

* * * * *